United States Patent [19]

Jiang

[11] Patent Number: 5,779,769

[45] Date of Patent: Jul. 14, 1998

[54] INTEGRATED MULTI-FUNCTION LAMP FOR PROVIDING LIGHT AND PURIFICATION OF INDOOR AIR

[76] Inventor: Pengming Jiang, 139 Fengtailukou, Beijing, China, 100071

[21] Appl. No.: 546,170

[22] Filed: Oct. 24, 1995

[51] Int. Cl.⁶ ............................................ B03C 3/155
[52] U.S. Cl. ............................. 96/55; 55/DIG. 38; 96/16; 96/63; 96/71; 96/100; 131/333; D23/365; D23/366; D26/113; D26/118
[58] Field of Search ................................ 96/15, 16, 70, 96/97, 96, 55, 60, 63, 71, 98, 100; 55/279, DIG. 38; 422/24; 131/333, 341-344; D23/364-366, 386; D26/113, 118, 119, 135

[56] References Cited

U.S. PATENT DOCUMENTS

| 3,747,300 | 7/1973 | Knudson | 55/516 X |
|---|---|---|---|
| 3,804,942 | 4/1974 | Kato et al. | 55/279 X |
| 4,072,477 | 2/1978 | Hanson et al. | 55/DIG. 38 |
| 4,227,446 | 10/1980 | Sone et al. | 55/276 X |
| 4,722,747 | 2/1988 | Armbruster | 55/487 X |
| 4,732,591 | 3/1988 | Tujisawa et al. | 422/123 X |
| 4,902,306 | 2/1990 | Burnett et al. | 55/528 X |
| 4,980,796 | 12/1990 | Huggins | 361/231 |
| 5,055,115 | 10/1991 | Yikai et al. | 96/97 X |
| 5,185,015 | 2/1993 | Searle | 96/16 |
| 5,230,720 | 7/1993 | Kendall | 55/279 X |

Primary Examiner—Richard L. Chiesa
Attorney, Agent, or Firm—Bo-In Lin

[57] ABSTRACT

An integrated lamp air purification and cleansing system is disclosed which includes a lamp body which supports a lamp and contains an air purification system. The lamp body includes an air inlet for drawing in air and an air outlet for blowing out the air. An air purification system is enclosed in the lamp body for filtering and cleaning the air flow drawn in from the air inlet whereby the air flow blown out from the air outlet is filtered and purified. The air purification system includes an activated charcoal filter and an electrostatic filter for filtering particles from the air flow. The electrostatic filtering device further includes many elongated channels each surrounded by conductive channel walls which allow the air flow to pass through. Each of the elongated channels includes a discharging needle located in a center portion of the channel which induces an electrical discharge and ionization in the air flow passing through.

8 Claims, 3 Drawing Sheets

INTEGRATED MULTI-FUNCTION LAMP FOR PROVIDING LIGHT AND PURIFICATION OF INDOOR AIR

BACKGROUND OF THE INVENTION

1. Field of the Invention

This invention relates generally to a lamp which includes a pollution control system for filtering and cleaning the air. More particularly, this invention relates to an improved multi-function lamp with an air cleaning system which applies a novel and highly effective gas ionization technique, enabling the design and manufacture of small volume, low power, and multi-function air cleaner which is more suitable for home and indoor application.

2. Description of the Prior Art

The quality of indoor air is increasingly becoming a major health concern as more rooms are provided with climate control systems, e.g., an air conditioner, thus a room is often kept totally enclosed and not allowing adequate ventilation. In an enclosed rooms where there is tobacco smoke, the concerns of adverse effects on human health is even greater as the hazardous smoke can not be easily removed. Daily application of air cleaning or purification system in a small room is not yet feasible for several reasons. Frequently, such systems are voluminous thus occupying a great amount of space, or, the purification system generates annoying high levels of noise due to the operation of a high-power fan in order to facilitate air flow through the cleaning systems for filtering operations. These difficulties and undesirable performance characteristics prevent useful application of air purification technology in daily use even where the quality of air demands such system be operated for the benefits of human health.

Various types of air cleaners are disclosed for filtering and treating the indoor air. Knudson discloses in U.S. Pat. No. 3,747,300 entitled "Portable Electrostatic Air Cleaner" (issued Jul. 24, 1973) an electrostatic air cleaner utilizes three filtering elements in a series including a mechanical filter, an electrostatic air precipitator, and a charcoal filter down stream of the precipitator. Knudson's cleaner allows the filtering elements to be conveniently removed and cleaned. However, due to the facts that these three filters are all flat panels, the effective areas for attracting and filtering the fine particles are very small. Furthermore, a strong fan must be used to overcome the air flow resistance generated by three flat panels. Knudson's cleaner thus suffers from the disadvantages of generating high levels of noise, requiring high power consumption, being bulky and therefore occupies a large space while achieving only low filtering and cleaning results.

In U.S. Pat. No. 4,980,796 entitled "Gas Ionization System and Method" (Issued Dec. 25, 1990), Huggins discloses a gas ionization system which includes at least one pair of spaced electrodes, each of these electrodes being formed as a parallel wire screen. Again, the effective areas of these wire screens serving as filters and retainers of the pollution particles are very small. Furthermore, large volume and high powered fans are required as with Knudson's cleaner. Huggins' system, as shown in the patent, is more suitable for large scale industrial use. It does not provide for an indoor air cleaner to benefit the individual for home application.

Kato et al. disclose in U.S. Pat. No. 3,804,942, entitled "Air Purifier" (issued on Apr. 6, 1974) a highly complex, high-power air purification system which includes multiple air purification filters, and collectors. It has chemical filters, mechanical filters, an electrostatic air collector, and a germicidal lamp for irradiating ultraviolet rays. A sound absorbing chamber is further included downstream of a blower. The air purification system again is too complex and occupies too large a space and therefore is not suitable for home use.

Armbruster discloses in U.S. Pat. No. 4,727,747, entitled "Add-On Vehicle Air Filtration System" (issued on Feb. 2, 1988) an air purification and filtering system for use inside a vehicle. It applies a blower or fan to force the air through several layers of foam or activated carbon in an air chamber. The air purification system is not effective for filtering particles of small size since the foam or charcoal layers can only retain and remove coarse particles of 5 to 10 microns. Fine particles of 0.1 to several microns such as tobacco smoke particles cannot be removed by this filtration system. The filtration system is still not sufficient to satisfy the need of daily home use.

In U.S. Pat. No. 4,902,306, entitled "Dual-Dipole Electrostatic Air Filter" (issued on Feb. 20, 1990) Burnett et al. disclose a filter assembly for removing particulate matter from air forced through two pairs of oppositely charged woven electrostatic filtering material. Each pair of electrostatic filtering materials includes a positively charged and a negatively charged layer. An open cell foam layer is disposed between these two pairs of electrostatic filters. Metal girds then enclose the filtering elements. This air filtering assembly suffers similar disadvantages in that higher power has to be applied to blow the air through pairs of electrostatic filters and foam filters. Furthermore, the effective areas for retaining the particles are small due to the electrostatic filters being manufactured with a thin layer of electrostatic materials.

In U.S. Pat. No. 4,732,591 entitled "Air Cleaning Apparatus" (issued on Mar. 22, 1988), Tujisawa et al. disclosed an air cleaning apparatus in a flower pot which includes a hollow container provided with a ventilating hole in its lower portion and an opening in the upper portion with a fan placed inside the container and a device for driving the fan. The filter is made of nonwoven fabrics containing activated charcoal. A variety of deodorant agents may also be used as fling materials for the filter providing a deodorizing effect. Tujisawa et al. provide an air cleaning apparatus which can also be used as a flower pot However, the effect of removing smaller particles is still lacking as the filtering functions performed by the charcoal and various filling materials are only useful in removing particles of a size greater than 5 microns. The need to provide clean air in an indoor environment with the smoke particles generated by cigarette smoke is not satisfied by this air cleaning apparatus.

As demonstrated by the above mentioned air purifying patents and products, there is still a demand in the art of design and manufacture for an indoor air purification and cleaning system to provide a novel and effective system which overcomes the limitations and difficulties discussed above. Preferably, this air cleaning and purification system would not require a high-power fan nor generate great noise. Additionally, this air cleaning system would not occupy excess needed indoor space and would filter both the coarse and fine air particles.

SUMMARY OF THE PRESENT INVENTION

It is therefore an object of the present invention to provide a lamp with a multi-function air cleaner system which will overcome the aforementioned limitations and difficulties encountered in the prior art.

Specifically, it is an object of the present invention to provide an integrated lamp air purification and cleaning system suitable for indoor use without occupying additional necessary space.

Another object of the present invention is to provide an integrated lamp air purification and cleaning system wherein elongated channels with discharging needles are used for performing the electrostatic filtering to reduce the air flow resistance such that a very small fan may be used thereby reducing power requirements and the noise levels making it more suitable for indoor use.

Another object of the present invention is to provide an integrated lamp air purification and cleansing system wherein combined electrostatic filtering and activated charcoal filtering are employed for filtering both the coarse and fine particles in the air such as those generated by tobacco smoke.

Another object of the present invention is to provide an integrated lamp air purification and cleansing system wherein large surface area of fine particle collection per volume is provided by the use of elongated channels and discharging needles to effectively remove the fine particles in the polluted air.

Another object of the present invention is to provide an integrated lamp air purification and cleansing system wherein electrostatic filtering with elongated channels and discharging needles is applied to produce beneficial negative ozone and oxygen carrying ions suitable for indoor use without requiring the use of an ozone or negative ion generator.

Briefly, in a preferred embodiment, the present invention comprises an integrated lamp air purification and cleansing apparatus. This apparatus includes a supporting and containing means for supporting a lighting means thereon for providing light therefrom. The supporting and containing means further includes an air inlet for drawing in an air flow and an air outlet for blowing out the air flow therefrom. The apparatus further includes an air purification system disposed in the supporting and containing means for filtering and cleaning the air flow drawn in from the air inlet whereby the air flow blown out from the air outlet being filtered and purified. In another preferred embodiment for the integrated lamp air purification and cleansing apparatus, the air purification system includes an activated charcoal filtering means and an electrostatic filtering means for filtering a plurality of particles from the air flow. In yet another preferred embodiment for the integrated lamp-cleaner apparatus, the electrostatic filtering means further includes a plurality of elongated channels each surrounded by conductive channel walls for allowing the air flow to pass through wherein each of the elongated channels includes a discharging needle disposed substantially in a center portion of the channel which induces an electrical discharge and ionization in the air flow passing through.

An advantage of the present invention is that it provides an integrated lamp air purification and cleansing system suitable for indoor use without occupying additional necessary space.

Another advantage of the present invention is that it provides an integrated lamp air purification and cleansing system wherein elongated channels with discharging needles are used to perform the electrostatic filtering which reduces the air flow resistance. The reduced resistance allow this apparatus to use a smaller fan, which reduces power requirements and reduces the noise level.

Another advantage of the present invention is that it provides an integrated lamp air purification and cleansing system wherein large surface area of fine particle collection per volume is provided by the use of elongated channels and discharging needles to effectively remove the fine particles in the polluted air.

Another advantage of the present invention is that it provides an integrated lamp air purification and cleansing system wherein combined electrostatic filtering and activated charcoal filtering are employed for filtering both the coarse and fine particles in the air such as those generated by tobacco smoke.

Another advantage of the present invention is that it provides an integrated lamp air purification and cleansing system wherein electrostatic filtering with elongated channels and discharging needles is applied to produce beneficial negative ozone and oxygen carrying ions suitable for indoor use without requiring the use of an ozone or negative ion generator.

These and other objects and advantages of the present invention will no doubt become obvious to those of ordinary skill in the art after having read the following detailed description of the preferred embodiment which is illustrated in the various drawings.

DETAILED DESCRIPTION OF THE PREFERRED EMBODIMENT

Figure 2:
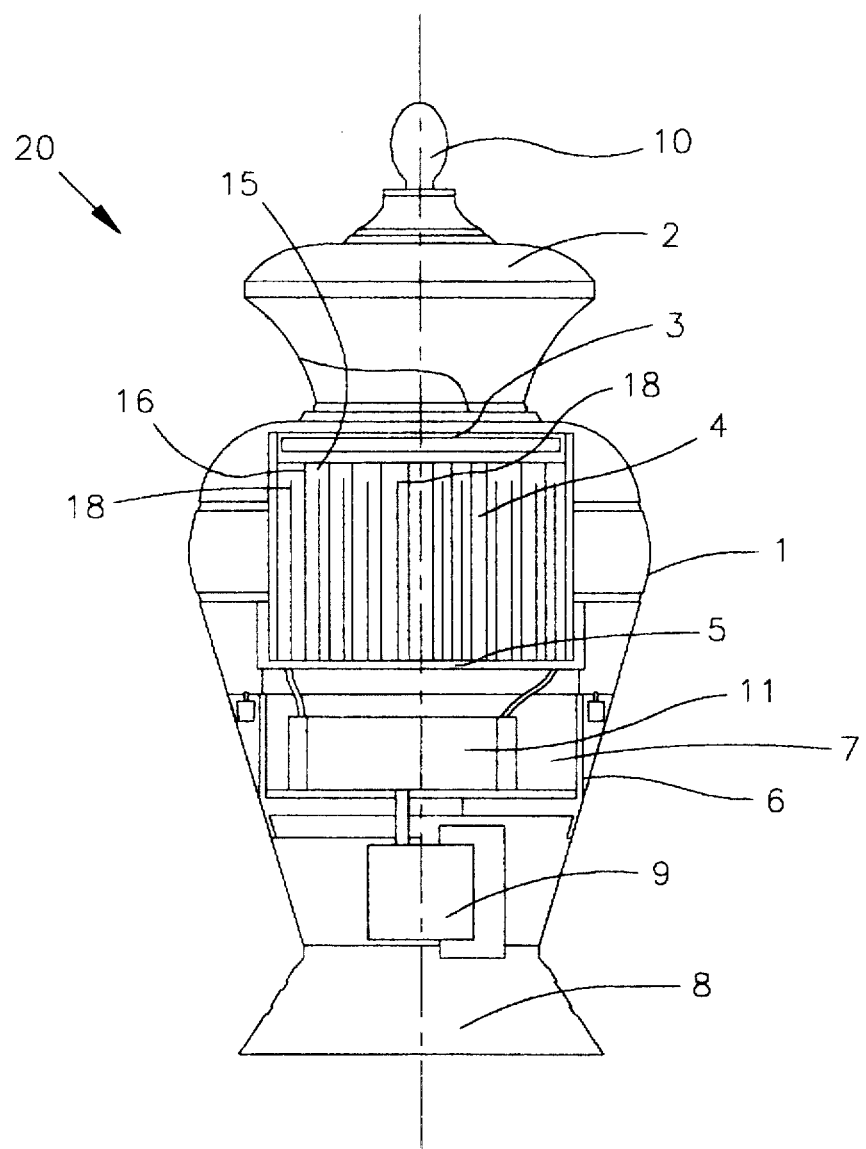
FIGS. 2 is a cross sectional view of the electrostatic filtering chamber of FIG. 1 which includes the honeycomb channels and discharging needles.

FIG. 2 shows a multi-function indoor air cleaner 20 of the present invention which can be also used as a lamp thus including a light bulb 10 supported by a lamp and cleaner container 1. On the top of the container 1 is an air inlet 2 where an air flow is drawn into contact with a coarse particle filtering system 3 which can be a layer of woven materials to filter out coarse particles. The filtered air flow then enters a honeycomb electrostatic cleaning chamber 4 where the incoming air is ionized and fine particles are retained on the walls of the honeycomb thus removed from the air. The air flow is further filtered by a layer of activated charcoal 5 before it is blown out at an air outlet 11 by a fan 9. The cleaner further includes a negative ion generator 6 and deodorant device 7 placed near the air outlet 11 for treating the air before it flows out of the cleaner 20. The power supply and voltage control of the electrostatic honeycomb chamber 4, the ozone ion generator 6, and the fan are controlled and provided by a voltage control device 8.

Figure 1:
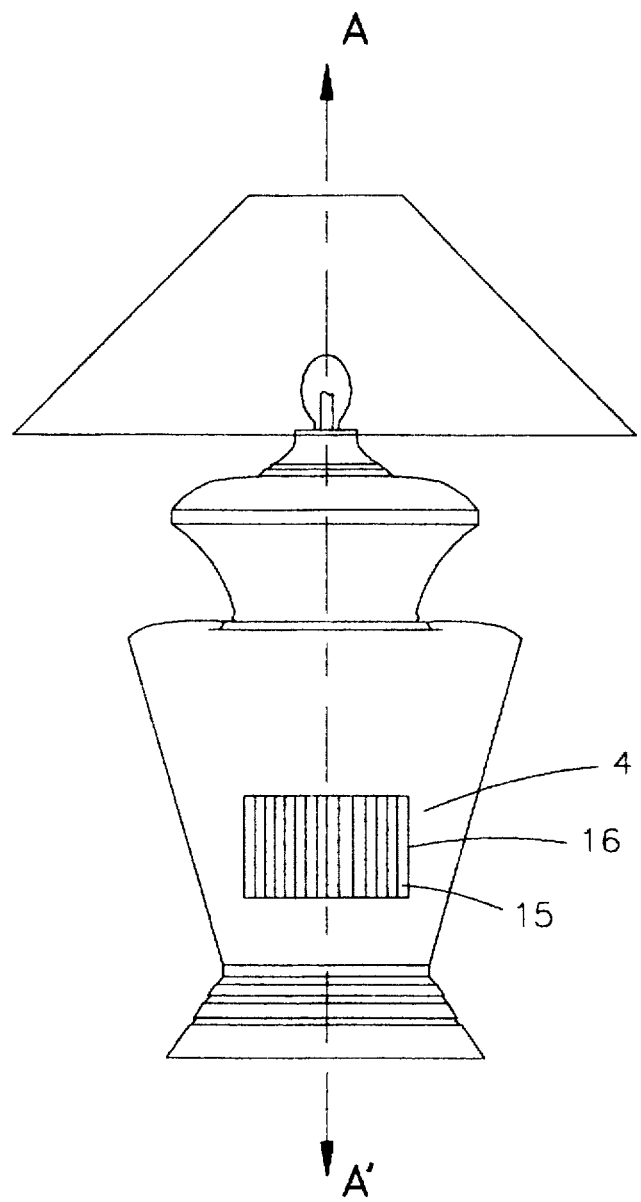
FIG. 1 is a perspective view of an integrated lamp air purification and cleansing system of the present invention.
Figure 3:
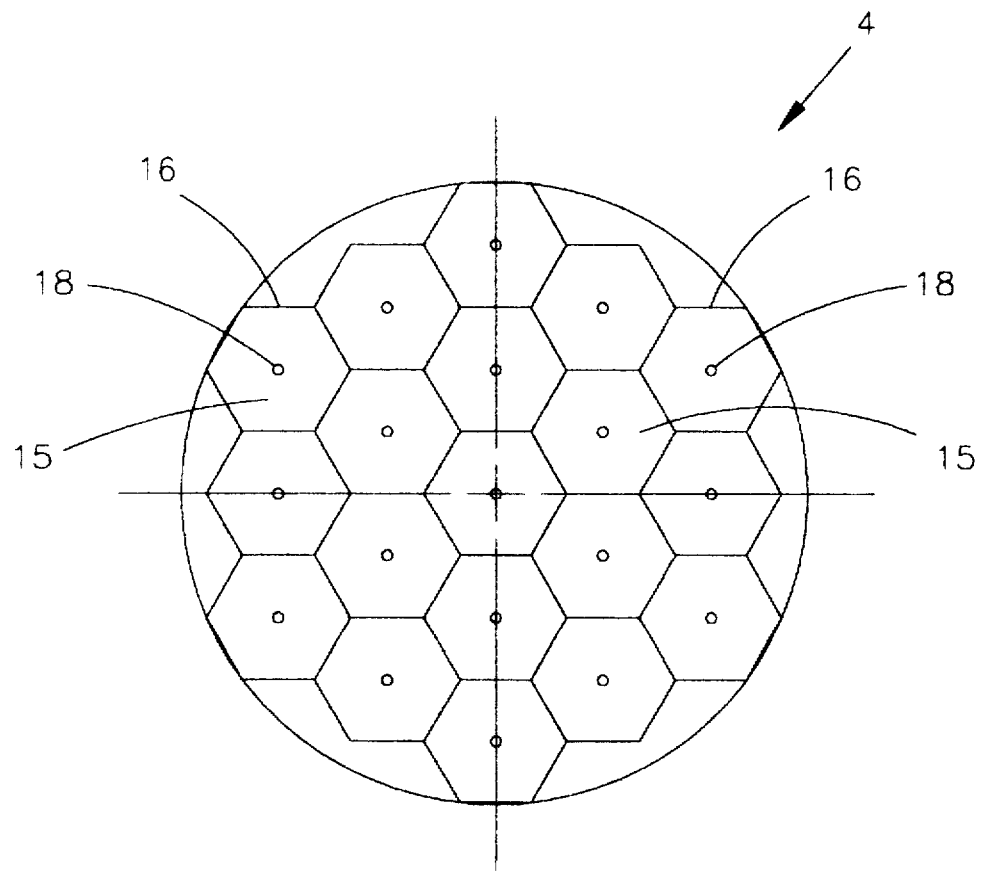
FIG. 3 is a perspective view of the integrated lamp air purification and cleansing system with a lamp shade serving as a means to enhance the inlet air flow.

FIG. 3 shows a side cross sectional view of the electrostatic cleaning chamber 4 in the direction of A-A' (see FIG. 1). The electrostatic cleaning chamber 4 includes a plurality of honeycomb channels 15 wherein each channel 15 is surrounded by honeycomb walls 16. Each channel 15 further includes a discharging needle 18 disposed substantially in the center of the channel 15. Each needle 18 is connected to the voltage control device 8 and is provided with a high positive voltage. The positive voltage provided by the voltage control device to the discharging needles 18 in the honeycomb channels 15 is in the range of about 4000 to 7000 volts. Each needle point is located near the inlet of the channel 15. A discharge from the needle point generates a plurality of negative ions in the honeycomb channels 15. The electrostatically charged ion particles will attract very fine particles from the air stream. The very fine particles attracted to the negative ions are then retained by the walls 16 of the honeycomb channels 15 which is composed of thin layer of conductive metals and may be provided with a very low positive voltage at approximately 110 volts. The very fine particles, as small as 0.1 micron in diameter, such as the smoke particles from tobacco smoke in the air stream are effectively filtered out.

For those of ordinary skill in the art it can be readily appreciated that large effective areas are provided by the honeycomb walls 16 for attracting and retaining the ionized particles along the channel 15. Excellent filtering and cleaning effects can therefore be achieved because of this honeycomb channel arrangement. The honeycomb shape is selected for its ease of manufacture and its provision for large effective filtering areas among several elongated channel shapes. For a regular cleaner, the length of the channel 15 is about five to fifteen centimeters long. The length for one side of the electrostatic cleaning chamber 4 is about ten to twenty five centimeters which includes approximately fifteen to twenty honeycomb channels 15. In addition to the advantage that the honeycomb channel walls 16 provide large effective filtering areas, in comparison to the traditional filtering devices such as layers of woven materials, the channels 15 further provide the advantage that minimum air flow resistance is generated. Large flow areas in each of the channels 15 allow the air stream to freely pass thus reducing the power requirement of a fan.

The air flow after passing through the electrostatic cleaning chamber 4 is then filtered by the activated charcoal layer 5. The charcoal layer 5 includes woven fabric types of activated charcoals for further removing residual dust from the air. The air flow is further treated with a deodorant agent 7 and provided with more negative charged ions by the ozone ion generator 6 before it is released from the air outlet 11. The ozone generator 6 is optional. The ozone ions and the negative oxygen carrying negative ions generated for release into the room create a pleasant sensation simulating the composition of air in a forest. As the negative ions that generate from the needle point in the honeycomb channel 15 also provide similar effect, the ozone generator may not be necessary.

In addition to the advantage that this multiple function air cleaner 20 can simultaneously be used as a lamp and air cleaner, the lamp shade 30 (please refer to FIG. 1) which is often placed above the light bulb 10 can further serve as an inlet air flow enhancement device for funneling the air into the air inlet 2. The effectiveness of cleaning the air is further improved with this reflective function served by the lamp shade. The inlet air flow enhancement device 30 can be designed with different shapes and sizes to provide optimal reflection for the inlet air to enter into the integrated lamp air purification and cleansing system 10. Under certain circumstances, the multiple function air cleaner-lamp may be a hanging lamp which is attached to a ceiling. As the fine particles tend to flow upwardly to the ceiling because of their lower density, an air cleaner such as one attached to the ceiling is very effective in filtering and cleaning the air by effective use of this natural circulation phenomena.

The present invention thus discloses an integrated lamp air purification and cleansing apparatus 20. This apparatus 20 includes a supporting and containing means 1 for supporting a lighting means 10 thereon for providing light therefrom. The supporting and containing means 1 further includes an air inlet 2 for drawing in an air flow and an air outlet 11 for blowing out the air flow therefrom. The apparatus 20 further includes an air purification system disposed in the supporting and containing means 1 for filtering and cleaning the air flow drawn in from the air inlet whereby the air flow blown out from the air outlet 11 being filtered and purified. In another preferred embodiment for the integrated lamp air purification and cleansing apparatus, the air purification system includes an activated charcoal filtering means 5 and an electrostatic filtering means 4 for filtering a plurality of particles from the air flow. In yet another preferred embodiment for the integrated lamp-cleaner apparatus 20, the electrostatic filtering means 4 further includes a plurality of elongated channels 15 each surrounded by conductive channel walls 16 for allowing the air flow to pass through wherein each of the elongated channel including a discharging needle 18 disposed substantially in a center portion of the channel 15 for inducing an electrical discharge and ionization in the air flow passing there through. In yet another preferred embodiment of the integrated lamp-cleaner, it further includes an inlet air flow enhancing means 30 which being a light shade for covering the lighting means 10 and for reflecting the air flow into the air inlet 2 thus enhancing the air flow to enter into the air inlet 2.

This invention further discloses a novel air purification system for filtering and removing a plurality of particles in an air flow passing through. This air purification system includes an activated charcoal filtering means 5 and an electrostatic filtering means 4 for filtering and removing said plurality of particles. The electrostatic filtering means 4 includes a plurality of elongated channels 15 each surrounded by conductive channel walls 16 for allowing the air flow to pass through wherein each of the elongated channel 15 including a discharging needle 18 disposed substantially in a center portion of the channel 15 for inducing an electrical discharge and ionization in the air flow passing there through thus enhancing filtering and removal of the particles in the air flow. The air purification system further includes an electrical voltage control means 8 for providing a positive electrostatic voltage to the needles 18 for inducing an ionization for producing negative ions in the air flow. The air purification system further includes an electrical fan 9 for drawing in and for blowing out the air flow from the air purification system wherein the electrical fan being a low noise fan producing a noise level lower than 50 dB.

Table 1 lists the test results of the air cleaning effects performed by a national environmental test center. Table 2 lists the range of other parameters.

TABLE 1

| Air Purification Test: One-Pass Cleaning Results | | | | | |
|---|---|---|---|---|---|
| | | Outlet (mg/m$^3$) Concentration | | Cleaning (%) Efficiency | |
| Air Pollutant | Inlet (mg/m$^3$) Concentration | Low Speed | High Speed | Low Speed | High Speed |
| SO$_2$ | 0.294 | 0.228 | 0.240 | 22.4 | 18.4 |
| NO$_x$ | 0.204 | 0.149 | 0.161 | 27.0 | 21.1 |
| TSP* | 3.855 | 0.474 | 0.550 | 87.7 | 85.7 |
| RMC** | 0.443 | 0.105 | 0.110 | 76.3 | 75.2 |
| RMC/TSP | 0.115 | 0.221 | 0.200 | — | — |

*TSP (Total Suspension Particles) include particles having diameter less than 30 μm.
**RMC (Respirable Mass Concentration) include particles having diameter less than 10 μm.

TABLE 2

Other Parameters

| Parameters | Range | | Unit |
| --- | --- | --- | --- |
| | High Speed | Low Speed | |
| Volume of Air Replaced | 62 | 78 | m³/h |
| Noise* | 50 | 55 | dBA |
| Concentration of negative oxygen carrying ion | 2.16 × 10⁴ | 1.97 × 10⁴ | #/cm³ |
| Concentration of Outlet Ozone | 0.10 | 0.08 | mg/m³ |

*Background noise is 40 dB.

A multi-function air cleaner system is therefore provided in this invention to overcome the limitations and difficulties encountered in the prior art. Specifically, an integrated lamp air purification and cleansing system is disclosed in this invention which is suitable for indoor use without occupying additional space. The integrated lamp air purification and cleansing system employs elongated channels with discharging needles which perform the electrostatic filtering necessary to reduce the air flow resistance enabling a very small fan to be used thereby reducing power requirements and the noise level. It is therefore more suitable for indoor use. The integrated lamp air purification and cleansing system further combines the electrostatic filtering with activated charcoal filtering to filter both the coarse and fine particles from the air. It is therefore more suitable for indoor use where very fine particles are generated from tobacco smoke. Furthermore, the integrated lamp air purification and cleansing system generates negatively charged ozone ions through the electrostatic filtering function with elongated channels and discharging needles without requiring the use of an additional ozone generator. The negatively charged ozone ions provide a pleasant odor and beneficial health effects to the indoor environment.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

I claim:

1. A vertical unit-body multiple-function lamp-cleaner air purification apparatus comprising:

a vertical elongated supporting and containing means for supporting a lighting means thereon for providing light therefrom;

said supporting and containing means further including an air inlet for drawing in an air flow and an air outlet for blowing out said air flow therefrom;

a vertical elongated air purification system disposed in said vertical elongated supporting and containing means for filtering and cleaning said air flow drawn in from said air inlet whereby said air flow blown out from said air outlet being filtered and purified; and said vertical elongated air purification system further includes a vertical elongated electrostatic purifying means comprising a plurality of elongated channels surrounded by channel walls biased with a contaminant collecting voltage for purifying a plurality of particles from said air flow whereby a vertical single-body lamp-cleaner air purification apparatus with effective air purification operation can be provided without occupying extra horizontal surface areas.

2. The vertical unit-body lamp-cleaner apparatus of claim 1 wherein:

said vertical elongated air purification system further includes an activated charcoal filtering means for filtering a plurality of particles from said air flow.

3. The vertical unit-body lamp-cleaner apparatus of claim 2 wherein:

said vertical elongated electrostatic purifying means with said plurality of elongated channels each surrounded by conductive channel walls defining substantially a honey comb cross section for each channel for allowing said air flow to pass through wherein each of said elongated channel including a discharging needle disposed substantially in a center portion of said channel for inducing an electrical discharge and ionization in said air flow passing there through.

4. The vertical unit-body lamp-cleaner apparatus of claim 1 further comprising:

an inlet air flow enhancing means comprising a light shade for covering said lighting means and for reflecting said air flow into said air inlet thus enhancing said air flow to enter into said air inlet.

5. The vertical unit-body lamp-cleaner apparatus of claim 4 further comprising:

an air fan for drawing in said air flow from said air inlet and for blowing said air flow from said air outlet.

6. The vertical unit-body lamp-cleaner apparatus of claim 5 further comprising:

an electrical voltage control means for providing a voltage input to said lighting means, said vertical elongated electrostatic purifying means, and said air fan.

7. An vertical unit-body multiple-function lamp-cleaner air purification apparatus comprising:

a vertical elongated supporting and containing means for supporting a lighting means thereon for providing light therefrom;

said vertical elongated supporting and containing means further including an air inlet for drawing in an air flow and an air outlet for blowing out said air flow therefrom;

an inlet air flow enhancing means comprising a light shade for covering said lighting means and for reflecting said air flow into said air inlet thus enhancing said air flow to enter into said air inlet;

a vertical elongated air purification system disposed in said supporting and containing means including an activated charcoal filtering means and a vertical elongated electrostatic purifying means for purifying and cleaning said air flow drawn in from said air inlet whereby said air flow blown out from said air outlet being filtered and purified and a vertical single-body lamp-cleaner air purification apparatus with effective air purification operation can be provided without occupying extra horizontal surface areas;

said vertical elongated electrostatic purifying means including a plurality of elongated channels each surrounded by conductive channel walls biased with a contaminant collecting voltage defining substantially a honey comb cross section for each channel for allowing said air flow to pass through wherein each of said elongated channels includes a discharging needle disposed substantially in a center portion of said channel for inducing an electrical discharge and ionization in said air flow passing there through;

an air fan for drawing in said air flow from said air inlet and for blowing said air flow from said air outlet; and an electrical voltage control means for providing a voltage input to said lighting means, said electrostatic purifying means, and said air fan.

8. A vertical unit-body multiple-function lamp-cleaner air purification apparatus comprising:

a vertical elongated supporting and containing means for supporting a lighting means thereon for providing light therefrom;

said vertical elongated supporting and containing means further including an air inlet for drawing in an air flow and an air outlet for blowing out said air flow therefrom;

an inlet air flow enhancing means comprising a light shade for covering said lighting means and for reflecting said air flow into said air inlet thus enhancing said air flow to enter into said air inlet;

a vertical elongated air purification system disposed in said supporting and containing means including an activated charcoal filtering means and a vertical elongated electrostatic purifying means for filtering and cleaning said air flow drawn in from said air inlet whereby said air flow blown out from said air outlet being filtered and purified and a vertical single-body lamp-cleaner air purification apparatus with effective air purification operation can be provided without occupying extra horizontal surface areas;

said vertical elongated electrostatic purifying means including a plurality of elongated channels each surrounded by conductive channel walls biased with a contaminant collecting voltage defining substantially a honey comb cross section for each channel for allowing said air flow to pass through wherein each of said elongated channels includes a discharging needle disposed substantially in a center portion of said channel for inducing an electrical discharge and ionization in said air flow passing there through;

an air fan for drawing in said air flow from said air inlet and for blowing said air flow from said air outlet, and an electrical voltage control means for providing a voltage input to said lighting means, said electrostatic purifying means, and said air fan wherein a positive voltage ranging from 4000 to 7000 volts are provided to said discharge needles in said vertical elongated channels.

* * * * *